United States Patent
Lambert

[15] 3,651,479
[45] Mar. 21, 1972

[54] APPARATUS FOR DETERMINING THE DIRECTION OF PROPAGATION OF A PLANE WAVE

[72] Inventor: Andre Simon Georges Lambert, Fresnes, France

[73] Assignee: Societe Alsacienne de Constructions Atomiques de Telecommunications et d'Electronique "Alcatel", Paris, France

[22] Filed: June 18, 1970

[21] Appl. No.: 47,472

[30] Foreign Application Priority Data

June 18, 1969 France ..................6920412

[52] U.S. Cl. .......................................340/172.5
[51] Int. Cl. ..............................................G01s 3/00

[58] Field of Search ..............340/172.5, 6, 16; 343/113

[56] References Cited

UNITED STATES PATENTS

| | | | |
|---|---|---|---|
| 3,163,844 | 12/1964 | Martin | 340/6 M |
| 3,311,870 | 3/1967 | Grohe et al. | 340/6 R |
| 3,371,320 | 2/1968 | Lachenmayer | 340/172.5 |

*Primary Examiner*—Raulfe B. Zache
*Attorney*—Sughrue, Rothwell, Mion, Zinn & Macpeak

[57] ABSTRACT

A switching system used in a system for determining the direction of propagation of a plane wave. The switching system comprises a matrix wherein each module connects a detector to an aggregation circuit according to predetermined coded data corresponding to predetermined wave directions.

11 Claims, 3 Drawing Figures

3,651,479

APPARATUS FOR DETERMINING THE DIRECTION OF PROPAGATION OF A PLANE WAVE

The present invention relates to apparatus for determining the direction of propagation of a plane wave in an isotropic medium.

In my copending application Ser. No. 46,667 filed June 16, 1970 there is described a method of determining the direction of propagation of a plane wave by aggregating digital signals from wave detectors spaced along a predetermined direction during preselected time intervals such that a given point in a plane wave travelling in the predetermined direction passes the successive detectors at the start of the intervals. The difference between the aggregated value for a given wave and that for a wave travelling in the predetermined direction provides an indication of the deviation of the path of the given wave from the predetermined direction.

Also described in this copending application is apparatus for determining the direction of propagation of a plane wave. The apparatus comprises wave detectors spaced along a predetermined direction, first circuitry for providing from each detector a digital signal in accordance with the detector output, and second circuitry for transmitting the digital signals to an aggregating circuit during preselected time intervals such that a given point in a plane wave travelling in the predetermined direction passes the successive detectors at the start of the time intervals.

In one embodiment of the invention described in the above-mentioned copending application, the detectors are arranged in subgroups spaced along the predetermined propagation direction. The detectors in each subgroup are connected to a respective aggregating circuit at the moments when the plane wave whose direction is to be determined passes the detectors with the same phase.

For each predetermined direction, the aggregate values are compared and the predetermined direction closest to the actual direction of propagation of the wave under investigation is given by the assembly of aggregating circuits giving the maximum mean value.

In order to increase the precision of this method of finding the direction of propagation of a plane wave, it is necessary to provide as many predetermined propagation directions as practicable, and also to use a large number of detectors. There is a requirement, therefore, to be able to rapidly modify the interconnections of the detectors and aggregating circuits for determining the propagation direction in a horizontal given plane or in a given solid angle defined by a bearing and angles of azimuth and elevation, for example.

For each of the predetermined propagation directions, the above-mentioned copending application describes a method of connecting the detectors to the aggregating circuits by means of logic gates so that signals are transferred from the detectors through the aggregating circuit at appropriate preselected time intervals.

For each predetermined direction, the complexity of the circuitry required for the different interconnections is proportional to the number of detectors. In the apparatus as a whole, the complexity of the circuitry and wiring is proportional to the number of predetermined directions chosen and in high precision apparatus with a large number of predetermined directions the circuitry and wiring can become excessively voluminous.

The size of the apparatus can become prohibitive when it is necessary to rapidly switch the interconnections of the detectors in order to determine the direction of propagation of a wave in one plane after finding the direction in another plane, for example.

It is thus necessary to provide an effective switching assembly for selectively interconnecting the detectors and aggregating circuits.

In accordance with this invention, therefore, apparatus for determining the direction of propagation of a plane wave comprises: wave detectors spaced along predetermined directions; for each predetermined direction, an assembly of circuits for aggregating digital signals from the detectors; and a switching assembly for connecting the detectors in a preselected sequence and at predetermined times to selected aggregating circuits. The switching assembly includes a matrix of gate modules each having a memory and a timer memory. The modules of each row of the matrix are connected to a single associated detector and the modules of each column of the matrix are connected to a single associated aggregating circuit assembly. The apparatus also comprises an arrangement for setting in the memory and timer memory of each module, respective codes identifying a particular aggregating circuit of the associated assembly, and the time during a subsequent time cycle at which the module is to transmit a digital signal from the associated detector to the aggregating circuit identified by the memory.

The invention will now be described in more detail, by way of example only, with reference to the accompanying diagrammatic drawings in which.

Figure 1:
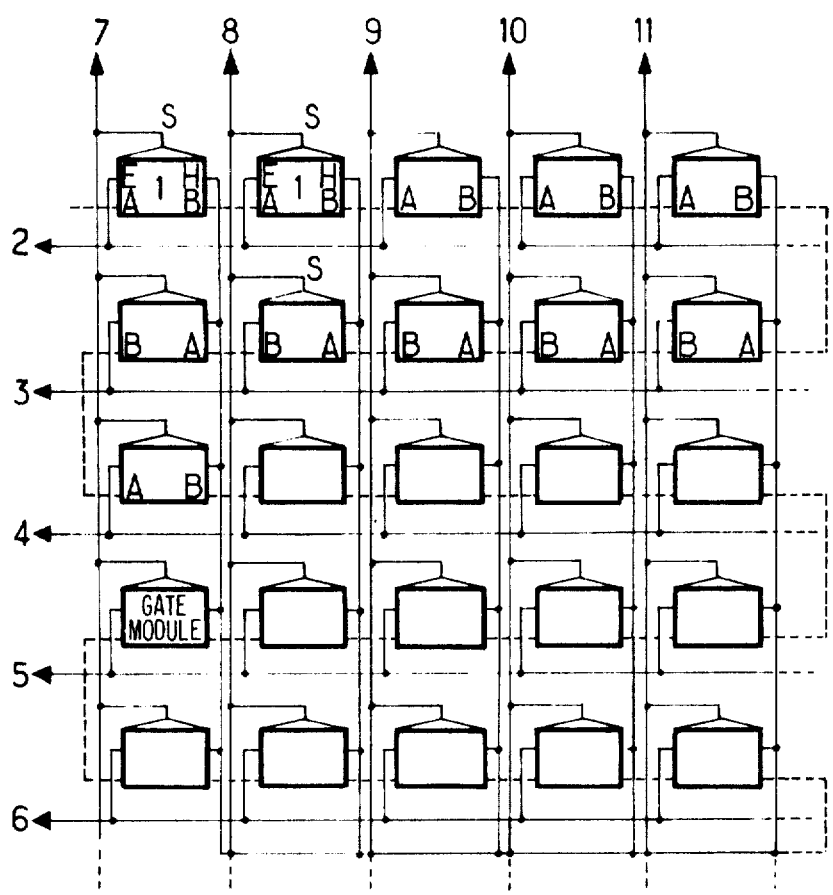
FIG. 1 shows a matrix assembly of gate modules.

Referring to FIG. 1, a matrix assembly of 25 gate modules is arranged in five rows each of five modules. The modules are identified by the reference numeral 1. Each module 1 has four terminals indexed respectively A, B, E and H. Terminals A and B of adjacent modules are connected together so that all the modules of the matrix assembly are connected in series.

An input E of each module of each row is connected to a respective detector, the detectors not being shown in the figure but the connections to them being indicated by the arrows 2, 3, 4, 5 and 6.

A fourth input H of each module is connected to the corresponding input of all the other modules. Each module has a group of outputs S. The outputs of all modules in a given column of the matrix are connected together to a respective aggregating circuit assembly. These assemblies are not shown in the figure, but the connections to them are indicated by the arrows 7, 8, 9, 10 and 11.

Figure 2:
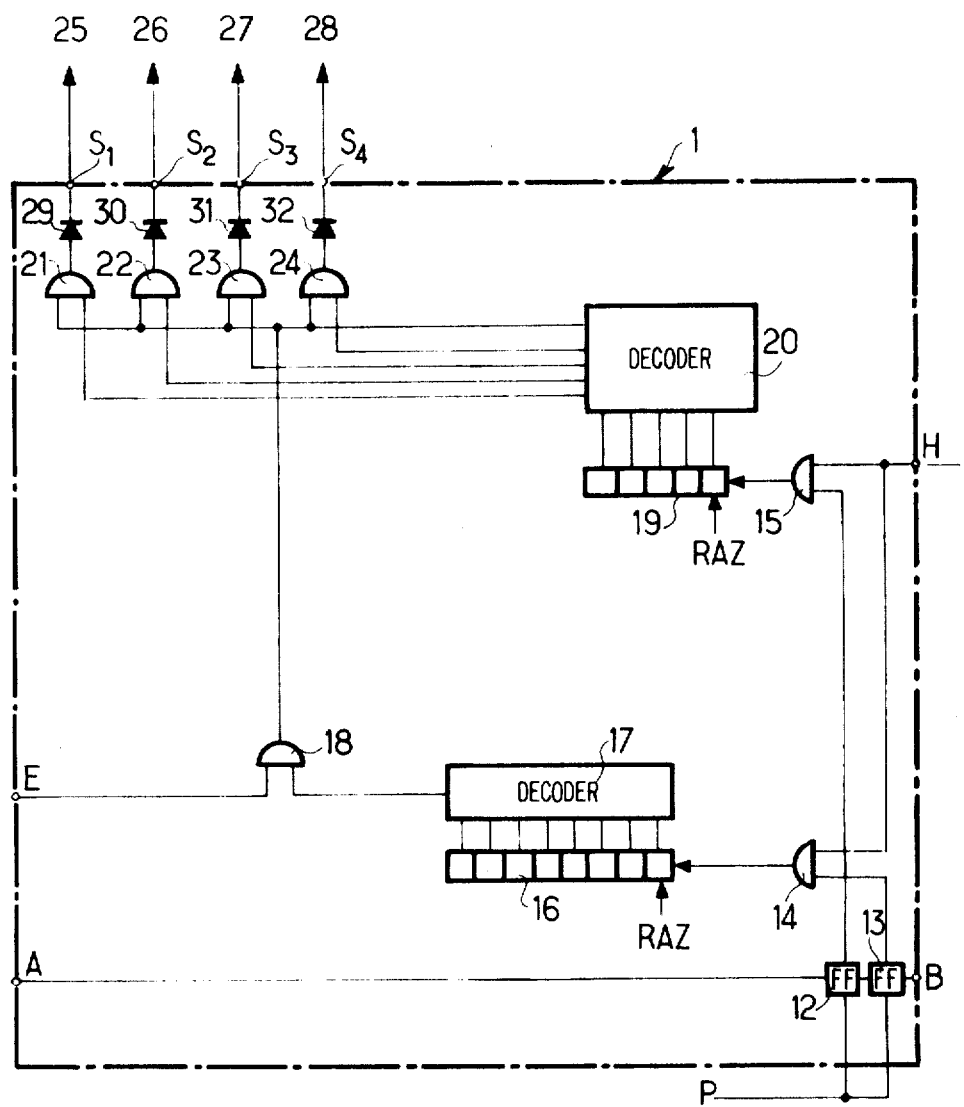
FIG. 2 shows one of the gate modules in more detail.

Referring now to FIG. 2, each module 1 includes two flip-flops 12 and 13. Flip-flop 12 has its input connected to terminal A and its output connected to the input of the flip-flop 13, the output of which is connected to the terminal B. Terminal B is connected to the terminal A of the next gate module in the assembly. In this manner the flip-flops 12 and 13 of the successive modules make up a shift register. Control inputs of the flip-flops 12 and 13 are connected in parallel to a line P which transmits shift control signals to all the flip-flops in synchronism.

Flip-flop 13 is connected to a reset-to-zero line and to a reset-to-one line.

Outputs of the flip-flops 12 and 13 are connected respectively to the first inputs of AND-gates 15 and 14, each having a second input connected to the terminal H. The output of gate 14 is connected to the input of a counting register 16 the input of which is connected to its output and the stages of which are connected to a decoder 17 arranged to provide a voltage pulse when the counter register 16 reaches state "-zero."

The counter register 16 is also connected to a return-to-zero line indicated RAZ in the figure.

The output of the decoder 17 is connected to a first input of an AND-gate 18 whose second input is connected to the terminal E. The counter register 16 and its decoder 17 constitute a timer memory.

The output of gate 15 is connected to the input of a memory comprising a shift register 19 the stages of which are connected to a decoder 20. The shift register 19 is also connected to a return-to-zero line indicated RAZ in the figure.

The output of AND-gate 18 is connected to a first input of each of four AND-gates 21, 22, 23 and 24. Each of these four AND-gates has its second input connected to a respective output of the decoder 20. The outputs of the gates 21, 22, 23 and 24 are connected through respective diodes 29, 30, 31, 32 to terminals $S_1$, $S_2$, $S_3$ and $S_4$. The terminals S are connected to respective aggregating circuits which are not shown in Figure 2, but to which the connections are shown by the arrows 25, 26, 27 and 28. Each aggregating circuit is connected to all the modules of a corresponding column of the matrix, so that at the input of any particular aggregating circuit five diodes such as 29 are connected in parallel. This parallel connection of the diodes constitutes an OR gate.

Figure 3:
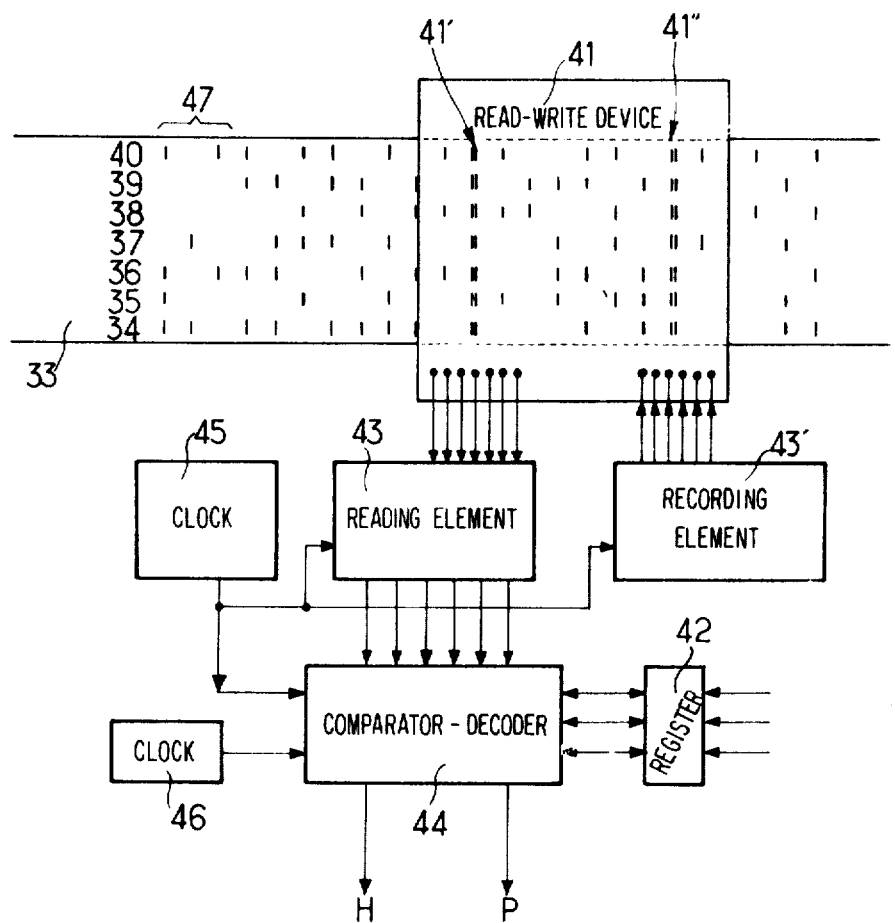
FIG. 3 shows a programming system for use with the assembly of gate modules.

Referring now to FIG. 3, the programming assembly for setting the memory and timer memory of each gate module comprises a tape 33 on which information is recorded on seven longitudinal tracks 34 to 40. The tape can be either a card in which the data is recorded as punched holes, or else a magnetic tape on which the data is magnetically recorded. A read-write device 41 includes a reading head 41' and a writing head 41''. The reading head 41' is connected to an electronic reading element 43 and the writing head 41'' is connected to an electronic recording element 43'. The elements 43 and 43' may be of any suitable known type.

Information is transmitted from the reading element 43 to a comparator-decoder 44 of known type which has two outputs H and P connected respectively to the terminals H and line P of the assembly of gate modules. The information is also transmitted to a register 42 in which is set an address code to be located.

An electronic clock circuit 45 controls operation of the elements 43 and 43' and the comparator section of the comparator-decoder 44. Another clock circuit 46 controls the operation of the decoder section of the comparator-decoder.

Of the seven information tracks 34 to 40, six are used for recording and the seventh track 40 serves as a checking track. The six bits of each transverse line across the six tracks are read sequentially, decoded and converted into a sequence having a maximum of 63 bits corresponding to the parallel character read and decoded. The recycling sequences are recorded on the band 33 in blocks. The first three characters, that is to say the first three columns 47, form an address code for the block in question. This address code enables the location of a block on the band corresponding to a predetermined group of propagation directions. The following characters on the band, in pure binary code, correspond to the codes to be inserted in the memory and timer memory of each gate module.

Before a recycling operation, the counters 16, the registers 19, and all of the flip-flops 12 and 13 are reset to zero, except, the flip-flop 12 of the first gate modules, which is set to "one."

The first of the three characters 47 are read, decoded and compared with the code of a required block which has been previously set in the register 42. If there is no coincidence between the two address codes, the rest of the block is not read and the band 33 passes to the address code of the next block. When there is coincidence between the address code of the band and that of the register 42, the remaining characters of the block are read. The fourth character of a block represents the code to be inserted in the register 19 to select one of the AND-gates 21 to 24. This code passes into the register 19 of the first module through the gate 15 which is held open by the flip-flop 12 which is set to "one."

A shift signal is then applied to line P by the decoder. The flip-flop 12 thus passes to state "zero" while the flip-flop 13 passes to state "one." The gate 14 opens and the following character on the band 33 is decoded and inserted in the counter 16 through the gate 14 which is held open by the flip-flop 13. The codes inserted in register 16 and 19 pass from the comparator-decoder 44 to the AND-gates 14 and 15 over the connection H.

A further shift signal is then applied by the decoder to the lines P and the flip-flop 13 is reset to zero, the flip-flop 12 of the following module receiving the state "one" previously in the flip-flop 13. The cycle starts again and continues to the reading of the last character in the block. The recycling is then stopped and the matrix assembly of gate modules is programmed with codes corresponding to a particular set of predetermined propagation directions.

The operation so far described consists only of the programming of the module gate assembly. The further operation for determination of a propagation direction is as follows:

The characters, recorded in each block of the band 33 and transferred to the memories and timer memories of the gate modules, are determined by calculating the time intervals between the passages of a plane wave past successive detectors, when the wave is travelling in a predetermined direction. These calculations provide the codes for each module which determine both the appropriate aggregating circuit to be connected to the corresponding detector, and the moment during a subsequent time cycle at which a signal is to be transferred from that detector to the aggregating circuit. During the subsequent operation, clock pulses are applied to the counters 16 of all the modules, which will count the pulses until they reach state "zero." The period of time which elapses before state "zero" is reached depends on the initial value inserted in the counter concerned. The counters operating in synchronism pass state zero at intervals equal to the propagation time of a plane wave between the corresponding detectors when travelling in the predetermined direction. The method of determining the propagation direction is further described and explained in the above-mentioned copending application.

The recording of the characters on the band is suitably carried out by connecting the programming assembly directly to the output of a calculating machine or computer.

It will be appreciated, in referring to FIG. 3, that the characters are read from the band at a rate determined by the clock 45 and converted into a series of bits at a repetition rate determined by the clock 46.

A modified system which is not illustrated in the drawings consists in recording on tracks 34 to 37 the number of bits corresponding to the codes to be inscribed in the memory and timer memory of each gate module. The matrix is thus recycled on four columns. The interconnections of terminals A and B are correspondingly modified.

What is claimed is:

1. Apparatus for determining the direction of propagation of a plane wave, comprising: wave detectors spaced along a plurality of predetermined directions; for each predetermined direction, an assembly of circuits for aggregating digital signals from the detectors, and a switching assembly for connecting said detectors in a preselected sequence and at predetermined times to selected aggregating circuits; the switching assembly including a matrix of gate modules each having a memory and a timer memory, said modules of each row of the matrix being connected to a single associated detector and said modules of each column of the matrix being connected to a single associated aggregating circuit assembly, and means for entering into the memory and timer memory of each said module respective codes identifying a particular aggregating circuit of said associated assembly and the time during a subsequent time cycle at which said module is to transmit a digital signal from said associated detector to said aggregating circuit identified by the memory.

2. Apparatus as claimed in claim 1 wherein said memory of each module is connected to each of said associated aggregating circuits through a respective first AND gate, a first input of each said first AND gate being connected to the memory output and the second input of each said first AND gate being connected to receive signals from said detector connected to said module.

3. Apparatus as claimed in claim 1, wherein said timer memory and memory of each said module are connected to receive their codes through respective second AND gates each of said second AND gates having a first input connected to receive said codes and a second input connected to receive pulses for opening said second gates.

4. Apparatus as claimed in claim 3, wherein said pulses for opening the second gates are provided by a pair of flip-flops in each said module, all of said flip-flops connected as a single shift register such that said flip-flops are switched successively, each flip-flop opening one of said second gates of its module.

5. Apparatus as claimed in claim 1, wherein said memory comprises a shift register connected to receive successive binary coded bits in accordance with the corresponding code, said memory coupled to a decoder providing a discrete output to the aggregating circuit identified by the code.

6. Apparatus as claimed in claim 1, wherein said timer memory comprises a counter connected to receive timer pulses and wherein said timer memory code consists of an initial value set in the counter so that a preselected count is reached at a selectable time in the subsequent time cycle, said counter being coupled to a decoder for detecting said preselected count.

7. Apparatus as claimed in claim 1, wherein said timer memory comprises a shift register connected to receive timer pulses and wherein the timer memory code consists of an initial state set in said register so that a preselected state is reached at a selectable time in the subsequent time cycle, said register being coupled to a decoder for detecting said predetermined state.

8. Apparatus as claimed in claim 4, wherein said means for entering includes means for data storage of the memory and timer memory codes, circuitry for reading data out of and into said storage means, a circuit means for setting a preselected code identifying a block of data in said storage, a comparator-detector connected to said circuit means and to said readout circuitry for identifying said data block, and output circuitry for feeding said data of said identified block into said memory and timer memory of each of said modules.

9. Apparatus as claimed in claim 8 further comprising a first electronic clock circuit for reading out data from said storage means at a first rate and a second clock circuit for transferring data to said modules at a second rate.

10. Apparatus as claimed in claim 8 further comprising means for presenting each code from said storage means simultaneously to all said second AND gates of which only one at a time is opened by said pulses to pass the code into the corresponding memory or timer memory, the order of opening of said second gates determining the code inserted in each memory and timer memory.

11. Apparatus as claimed in claim 2 further comprising a shift register, and means connecting the second inputs of each of said AND gates to selected stages of said shift register to determine the instant at which each of said aggregating circuits is connected to said memory.

* * * * *